United States Patent [19]

Crist

[11] 4,194,246
[45] Mar. 18, 1980

[54] NOISEMAKER BEACON
[75] Inventor: Ralph P. Crist, Harrisburg, Pa.
[73] Assignee: The United States of America as represented by the Secretary of the Navy, Washington, D.C.
[21] Appl. No.: 734,803
[22] Filed: May 12, 1958
[51] Int. Cl.² ............................................. H04B 11/00
[52] U.S. Cl. ................................................. 367/1; 9/9
[58] Field of Search ................................. 9/9; 340/5 D
[56] References Cited
U.S. PATENT DOCUMENTS

| | | | |
|---|---|---|---|
| 2,752,615 | 7/1956 | Parker | 9/9 |
| 2,825,803 | 3/1958 | Newbrough | 9/9 |

Primary Examiner—Verlin R. Pendegrass
Attorney, Agent, or Firm—R. S. Sciascia; Q. E. Hodges

EXEMPLARY CLAIM

1. An acoustic jammer assembly constructed for ejection from a signal tube on a submarine, said assembly comprising a cylindrical casing for containing various elements of the jammer; a high frequency acoustic noisemaker attached to one end of said casing and comprising a thick wall cylinder having the same outer diameter as said casing and including an energizing motor; a sea cell battery physically connected to said motor and electrically connected to said motor for energizing said motor and mounted inside said casing; a flotation unit mounted inside said casing and physically connected to said battery; said flotation unit comprising a collapsed parachute, an inflatable balloon having a gas generating balloon inflating canister having a gas discharge opening in communication with the interior of said balloon, and a regulating valve in said balloon and actuated by said parachute for regulating the flotation depth of said flotation unit; a conical spring ejector compressed between said flotation unit and said battery for ejecting said flotation unit from said casing; a removable end cover plate for the casing, said cover plate including a trigger actuated mechanism so constructed as to be operated upon passage of the assembly through said signal tube thereby releasing the cover plate from the casing, whereby said compressed ejector spring may eject said flotation unit and allow water to come in contact with the gas generator and battery.

6 Claims, 10 Drawing Figures

U.S. Patent  Mar. 18, 1980  Sheet 1 of 5  4,194,246
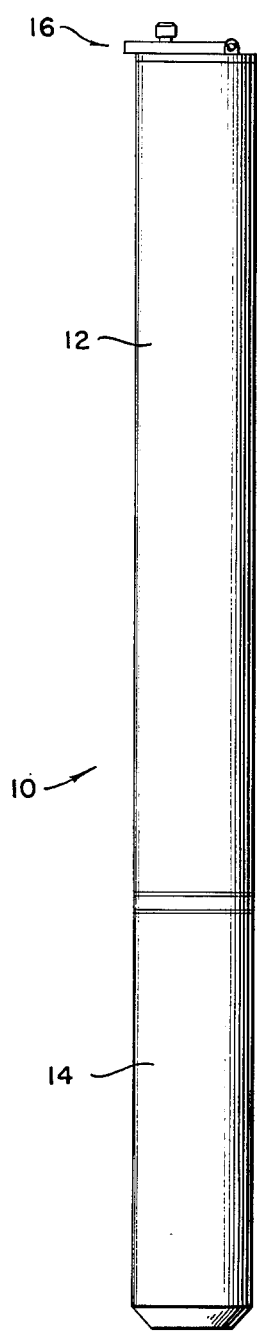
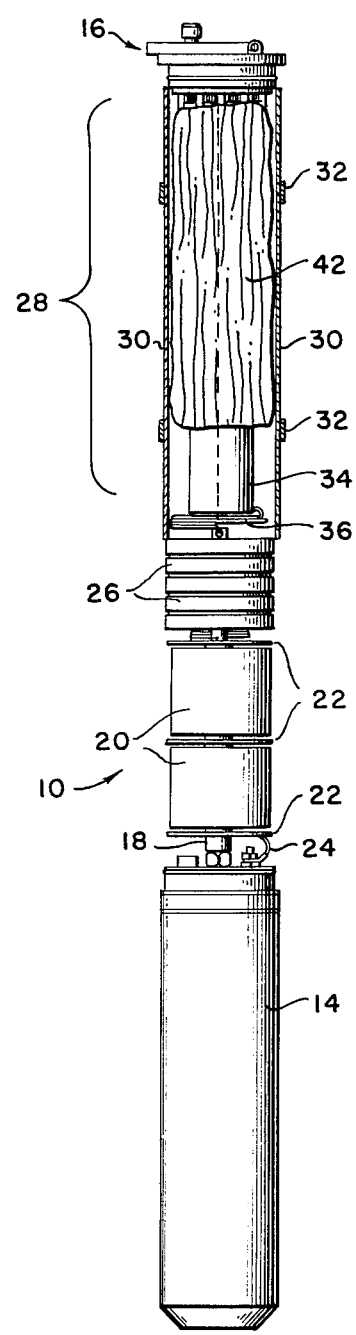

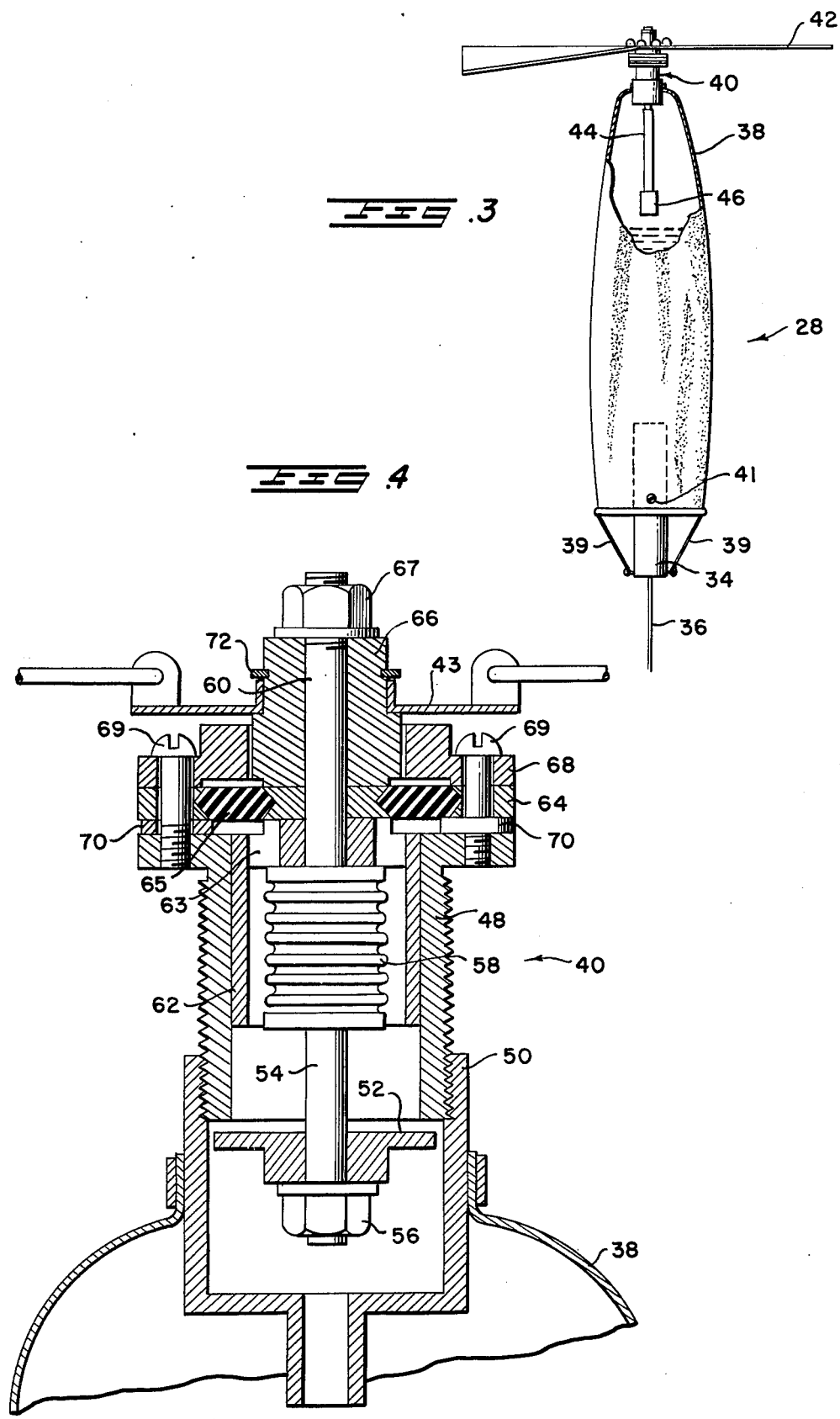

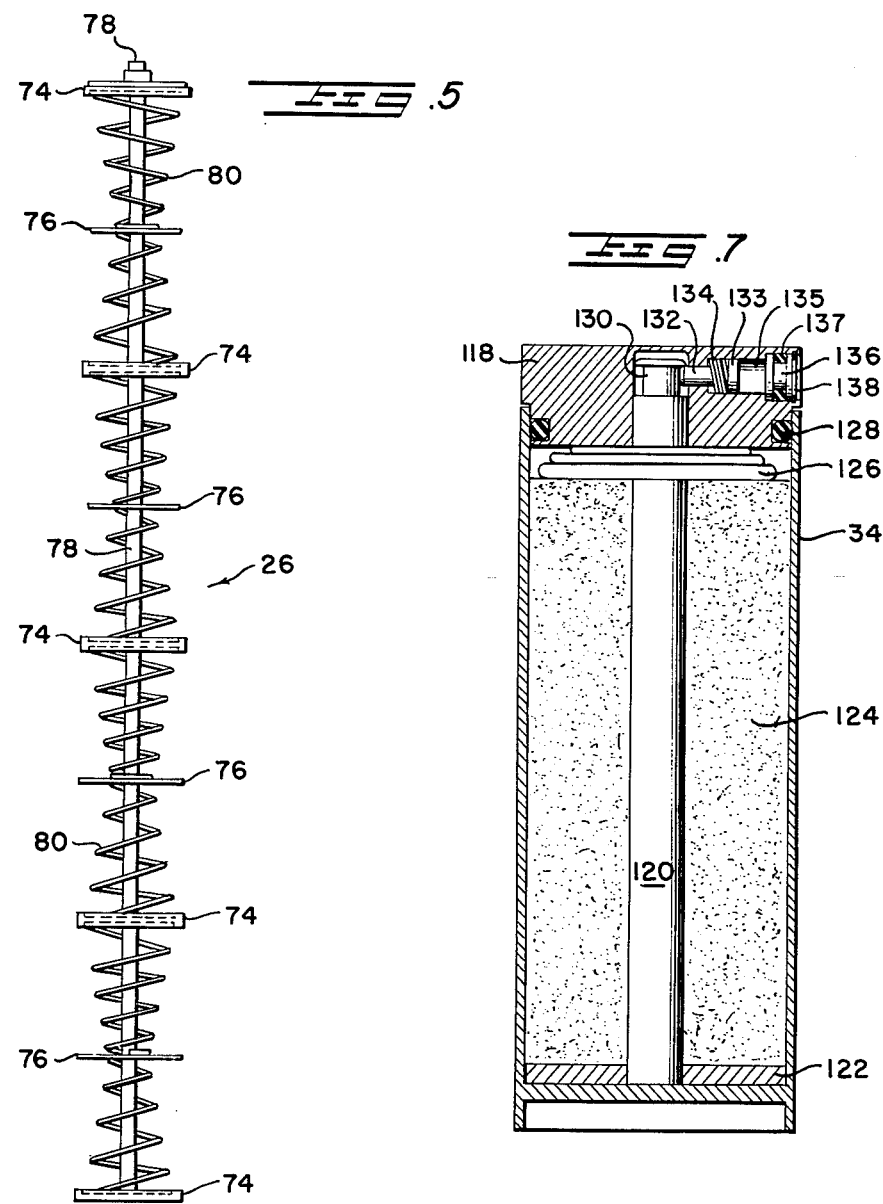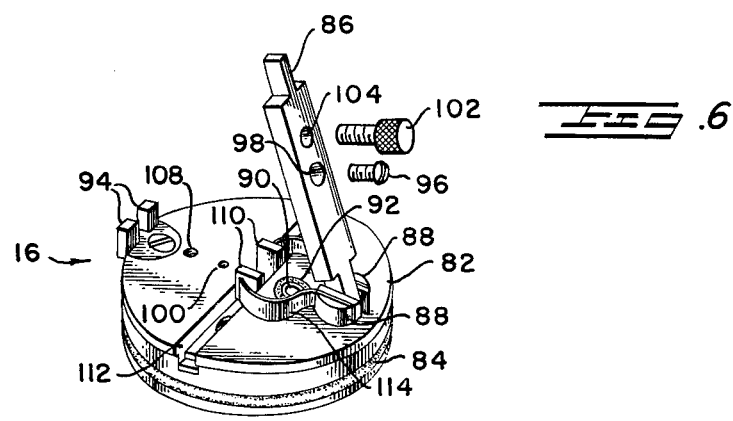

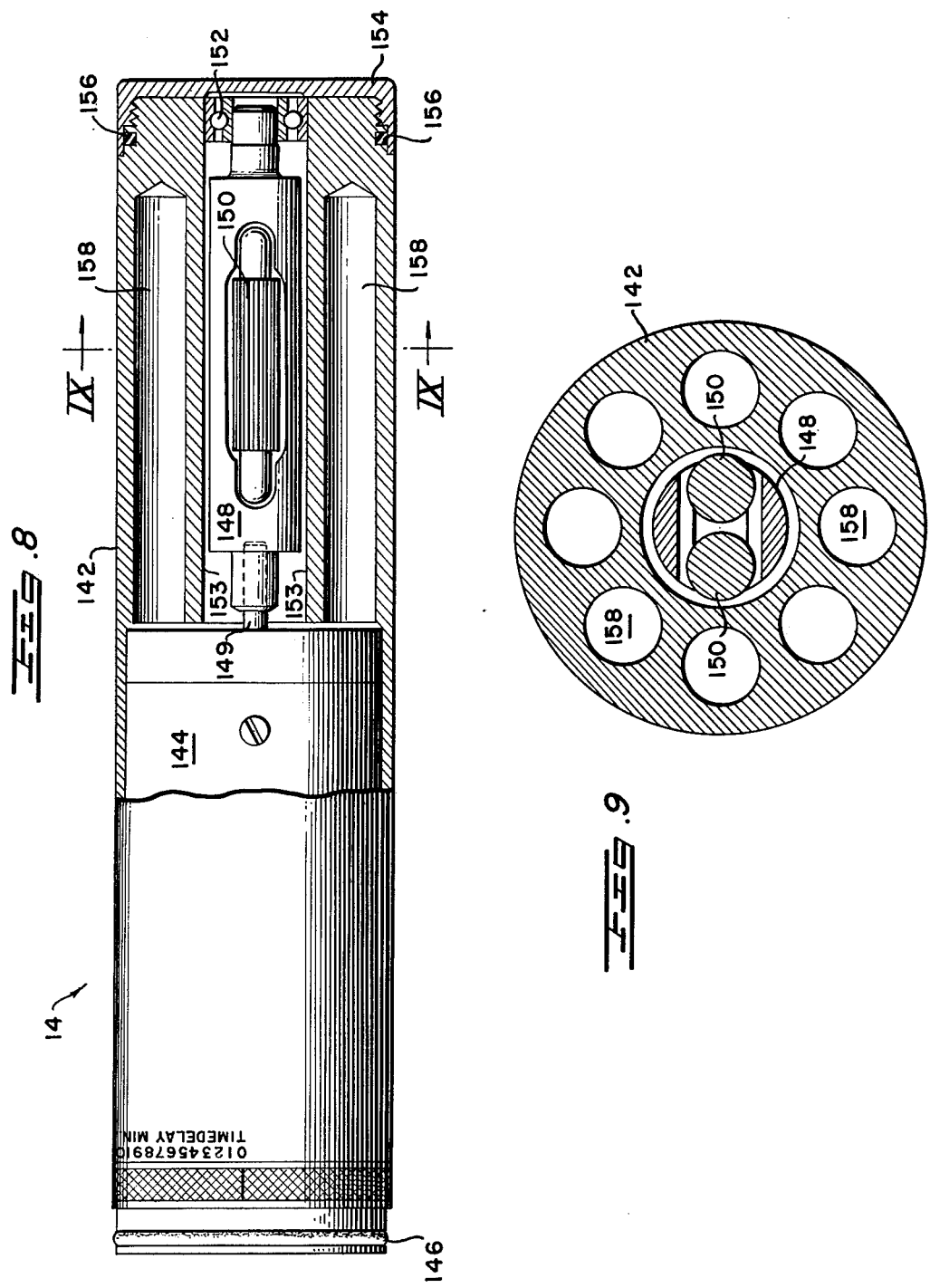

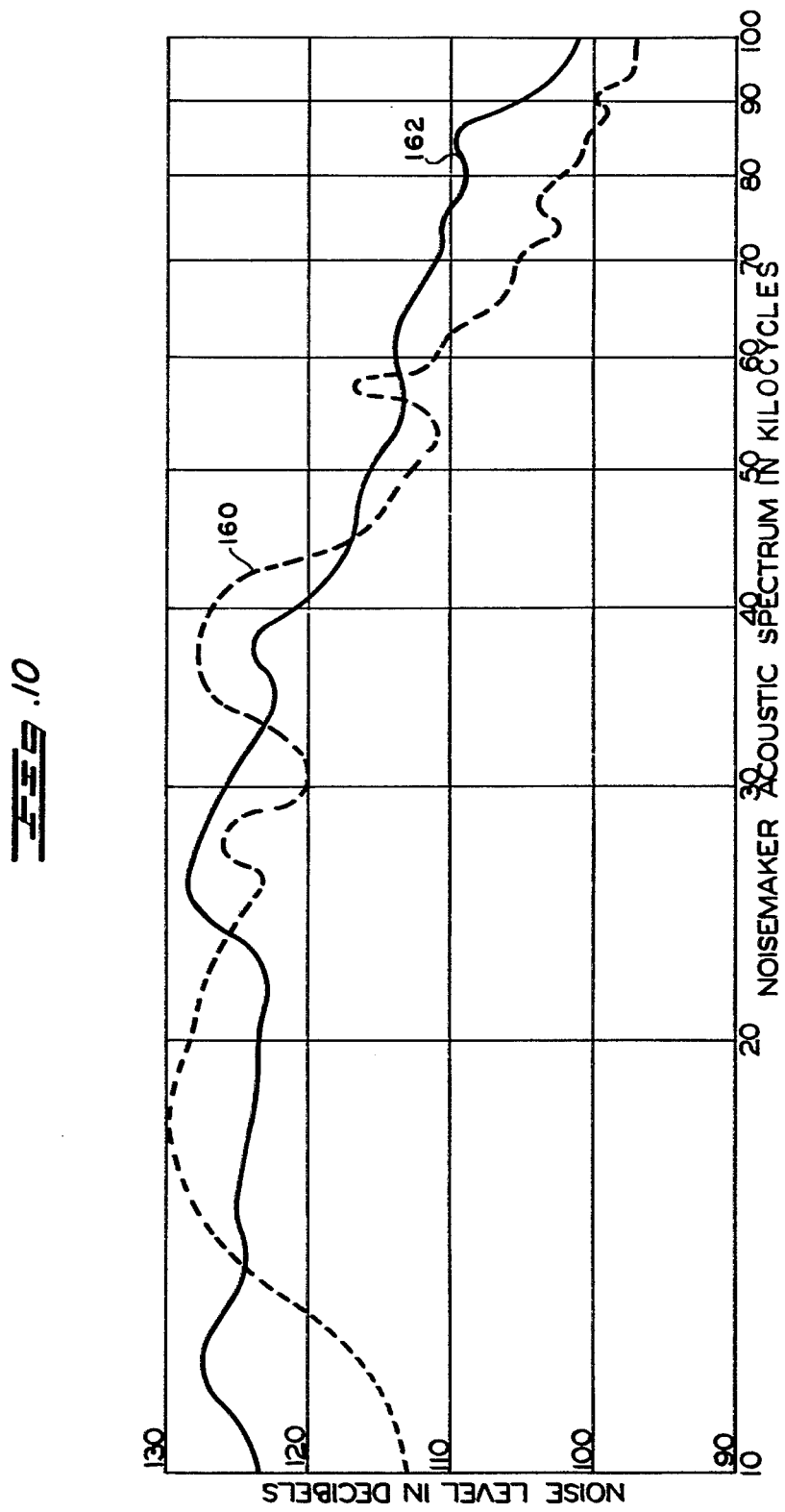

NOISEMAKER BEACON

The invention described herein may be manufactured and used by or for the Government of the United States of America for governmental purposes without the payment of any royalties thereon or therefor.

This invention relates to a noisemaker beacon which can be used either as a sonar jammer or as a countermeasure against acoustic torpedoes.

The beacon comprises a noisemaker which generates a wide band, high intensity, random noise which is supported in the water by a flotation generally consisting of a balloon inflated by a gas generator. The flotation is folded, placed in a casing, and stored in a submarine. When under attack by an enemy ship having a hydrophone or sonar equipment, the submarine launches the beacon and tries to escape without being detected by the hydrophone or sonar.

In the past a number of sonar jammers have been designed which, however, suffer from a number of defects. These prior devices used smokeless powder to separate the beacon after it was launched from the submarine. The smokeless powder was unsatisfactory since high pressures were created in the beacon before separation and the rapid separation would cause damage to components such as the sea-cell battery and valves.

The trigger mechanisms of these devices consisted of several parts, each of which could cause a missfire.

In these devices an inflatable balloon is supplied with a gas by means of a canister holding a chemical which will react with the seawater to generate hydrogen. It has been found that when these canisters are used at depths of 1000 feet that a protective layer is formed in the top of the canister which prevents the quick formation of any hydrogen gas when the balloon reaches the operating depth.

These prior devices have a tendency to rise to near the surface of the water and then to oscillate up and down instead of remaining fixed. In addition the variation of the trapped buoyancy of these beacons due to the normal manufacturing tolerances made each one float at a different depth and no convenient means was provided for securing a constant depth of operation.

These prior devices also had a poor acoustic output from the noisemaker in the frequency range above 20 kilocycles per second.

An object of this invention is therefore to eliminate the use of smokeless powder to separate the beacon at depths of at least 1000 feet below the level of the ocean by means of a spring ejector.

Another object of this invention is to provide a simple and reliable trigger mechanism for the beacon which comprises a simple trigger arm which closes an 0-ring seal.

Another object of this invention is to provide a flotation valve which is operated by a bellows and a damping parachute so that the noisemaker will remain at a relatively constant depth in the water.

Another object of this invention is to provide a gas escape tube which may be easily cut to a proper length so that the actual level in the water at which the noisemaker floats may be easily regulated due to variations in the weight of the noisemaker.

Another object of this invention is to provide an improved acoustic output from the noisemaker above 20 kilocycles.

Other objects and advantages of the invention will hereinafter become more fully apparent from the following description of the annexed drawings, which illustrate a preferred embodiment, and wherein:

FIG. 1 is a view in elevation of the assembled noisemaker beacon;

FIG. 2 is a view of the assembled beacon with the casing removed;

FIG. 3 is a view in elevation showing the flotation as it appears in the operating position;

FIG. 4 is a cross-section view of the depth regulating buoyancy valve;

FIG. 5 is a detailed view of the spring ejector;

FIG. 6 is a detailed view of the trigger mechanism assembly;

FIG. 7 is a view, partly in cross-section, of the chemical canister;

FIG. 8 is a view, partly in cross-section, of the noisemaker;

FIG. 9 is a cross-sectional view of the noisemaker in FIG. 8 along the lines IX—IX; and FIG. 10 is a graph of the output of the two types of noisemakers which are further described in the specification below.

Referring now to the drawings, wherein like characters designate like or corresponding parts throughout the several views, there is shown in FIG. 1 an assembled noisemaker beacon indicated at 10 comprising a casing 12 having a noisemaker 14 at the lower end and a trigger assembly 16 at the other end.

In operation the noisemaker beacon is designed for launching from the signal tube of a submarine. The breech of the signal tube is opened and the beacon is inserted in the tube with the noisemaker 14 being inserted first and with the complete beacon being pushed forward in the tube so that there is a space of about eight inches at the rear of the noisemaker.

The breech of the signal tube is then closed and the outer end of the tube is opened to allow the tube to be flooded with water. A rubber diaphragm at the rear of the signal tube is then operated by air pressure which ejects the beacon from the submarine. The trigger mechanism 16 engages a catch as it leaves the signal tube which trips the trigger mechanism. After the trigger mechanism is tripped, a flotation is ejected from the noisemaker casing 12, which flotation is inflatable and raises the beacon up to about a depth of 20 feet below the surface of the water.

The noisemaker, which is set off by a timer, operates to generate a large amount of random noise which effectively jams any sonar or hydrophone systems in the area and interferes with the operation of any acoustic torpedoes.

As more clearly shown in FIG. 2, where the casing 12 is removed, the noisemaker 14 is shown having an insulated rod 18 for supporting a plurality of sea-cell batteries 20. These sea-cell batteries 20 are of the magnesium-silver chloride type, concentrically wound, and will operate in either fresh or salt water. Insulating spacers 22 are used at each end of and in between the batteries 20. Connections are indicated at 24 for electrical connections to a motor mounted in the noisemaker 14.

A spring ejector 26 rests on the end of the insulating rod 18 in order to expel flotation 28 at the end of the casing. The flotation 28 is mounted within a pair of half sleeves 30, which serve to compress the spring ejector 26 during assembly and also serve to force the trigger mechanism 16 and the flotation 28 into the water after the trigger mechanism 16 is operated. Two split rings 32 serve to temporarily hold the two half sleeves 30 in place during the assembly of flotation 28 when pushed into the casing 12.

A chemical canister 34 is attached to the bottom of the flotation 28 for supplying additional gas to an inflatable balloon 38 (see FIG. 3). A nylon cord 36 is attached to the bottom of the chemical canister 34 and runs down through the spring ejector 26 where it is attached to the insulating rod 18. The nylon cord 36 is about 10 feet long with about 10" of it being disposed below the spring ejector 26 so that the cord may pass up through the spring ejector 26 as the ejector 26 expels flotation 28 from the casing 12.

In FIG. 3 is shown a more detailed view of the flotation 28 which brings the noisemaker 14 from the launching depth up to the normal operating depth of 30 feet below the surface and maintains its depth for a period of 20 to 25 minutes. The operating portion of the flotation 28 is a balloon 38 which is made of neoprene-coated nylon fabric. When filled with gas it is six inches in diameter and 24 inches long. Attached to the bottom of the balloon 38 is a chemical canister 34 by means of a screw 41 and two nylon cords 39. The nylon cord 36, which supports the noisemaker 14, is shown extending from the bottom of the canister 34.

A regulating valve 40 is fastened to the balloon 38 at the thereof, which serves to regulate the depth at which the flotation 28 operates. A folding parachute 42 is mounted at the top of the regulating valve 40 by means of a plate 43 attached by a ring 72 (see FIG. 4). The parachute 42 comprises 8 ribs which are mounted on the plate 43 and normally held in the open position by means of a plurality of springs. One of the ribs has a projection on the center and is held in a locked position once the parachute is open. The purpose of the locking rib is to obtain an angular rise during the time the flotation 28 is coming up to the operating depth, thereby preventing any masking of the noisemaker 14 by the gas bubbles from the sea-cell battery 20 or balloon 38.

A gas escape tube 44 is attached to the bottom of regulating valve 40 and a brass adapter and screen 46 are attached to the bottom of the gas escape tube 44. The gas escape tube 44 serves to regulate the amount of enclosed gas or buoyancy in the balloon 38 and its length can be varied in order to adjust the depth at which the flotation 28 will operate. The brass adapter 46 is provided to cause the tube 44 to hang in a vertical position, and the screen is attached to prevent the chemical in the balloon 38 from blocking the end of the tube.

100 grams of granular (18-30 mesh) lithium hydride are placed within the balloon 38 and the balloon is folded so that the chemical is protected from contact with the water until after the flotation 28 is ejected from the casing 12. As soon as the water strikes the chemical, hydrogen gas is liberated to fill the balloon 38, which brings it up to the operating position. The loose lithium hydride particles will react immediately with water regardless of the depth at which the beacon is launched.

In FIG. 4 is shown a more detailed view of the regulating valve 40 which has a valve body 48 and a valve shield 50 attached by screw threads as shown. In the central portion of the regulating valve 40 is a valve seat 52 shown attached to a first valve rod 54 by means of a hex nut 56, a sylphon bellows 58 is attached to the upper end of the first valve rod 54, and a second valve rod 60 is attached to the upper end of the sylphon bellows 58.

A valve sleeve 62 is slidably mounted inside the valve body 48 and is attached to the valve rod 60, by a number of sections which have a plurality of gas escape holes 63.

The valve rod 60 is attached to a diaphragm assembly 64 having inner and outer metallic sections and a central section 65 made of fairly stiff rubber.

A valve link 66 is attached to the upper end of the valve rod 60 and held in place by a hex nut 67.

A valve cap 68 holds the outer section of the diaphragm assembly 64 by means of screws 69. A plurality of washers 70 isolate the diaphragm assembly 64 from the valve body 48 so as to allow the excess gas to escape therebetween.

The parachute 42 is shown held on the valve link 66 by means of a clamping ring 72 placed in a circular slot.

After launching the beacon the trigger mechanism 16 is tripped which allows water to flow into the beacon. The sylphon bellows 58 is compressed which closes the valve seat 52 against the valve body 48. The chemical in the balloon reacts with the sea water which raises the noisemaker beacon towards the surface. At a depth of about 40 feet the sylphon bellows opens the valve seat 52 and gradually allows the excess gas to escape from the balloon 38. If too much gas has been vented, however, the beacon will sink and the sylphon bellows will close the valve seat 52. In order to aid this action and to keep the flotation unit at a relatively constant level the parachute 42 is shown attached to the valve link 66. This connection allows the parachute to exert a pressure on the valve rods and sylphon bellows to close the valve seat 52 when the parachute 42 moves down and thereby reduces the amount of oscillation in the system.

The spring ejector 26 is shown in extended position in FIG. 5 and comprises a number of large diameter spring retainers 74 and a plurality of small diameter spring retainers 76. These spring retainers are slidably mounted on a central rod 78, and separated by a plurality of conical springs 80. When the spring ejector 26 is compressed the conical springs fold up and allow the spring ejector to be compressed to a very short length. For example the ejector 26 may be 28 inches in length when expanded and only 2 inches in length when compressed. The rod 78 is used only during assembly.

The trigger mechanism 16 is shown in further detail in FIG. 6 and comprises a base member 82. Mounted on the outer edge of the base member 82, which is adapted to slide within the casing 12, is an O-ring 84 for sealing the trigger end of the casing. A trigger arm 86 is shown pivotally mounted on a pair of projections 88 from base 82. The trigger arm 86 covers a water entrance hole 90 which is sealed by means of an O-ring 92. The arm 86 also extends across the base 82 and projects between a pair of guides 94 where it is tripped as it leaves the launching tube. A shear screw 96 is shown adapted to be placed through a hole 98 in arm 86 and fastened in threaded hole 100 in the base 82. A safety screw 102 is shown adapted to fit through a hole 104 in arm 86 to fasten in threaded hole 108 to prevent the shear screw 96 from being inadvertently sheared. This safety screw 102 is removed just before launching. A pair of right angular locks 110 are shown mounted in a slot 112 in the base 82, which locks are forced inwardly by a pair of springs 114 which are fastened to the projections 88. The locks are used to keep the trigger mechanism 16 fastened to the casing 12 until the trigger arm 86 is tripped.

A detail view, partly in cross-section, of the chemical canister 34 is shown in FIG. 7. A cover 118 is shown mounted on top of the chemical canister or case 34 and sealed by means of an O-ring 128. A rod 120 is mounted in the center of the canister and slides into a disk 122. 90 grams of lithium hydride packed under a pressure of 10 tons are indicated at 124. A conical spring 126 mounted coaxial with the rod 120 is placed on top of the chemical 124 and acts to eject the cover 118. A groove 130 at the top of the rod 120 engages a release pin 132 having a shoulder 133 on the other end. A spring 134 moves the shoulder 133 and release pin 132 at the proper time. A piston 136 havng an O-ring seal 137 is shown at the outer end of the chamber 135 which supports the release pin 132. A retaining ring 138 holds this piston 136 in place.

When the beacon is launched the water entering the beacon forces the canister cover 118 down until the cover 118 hits the canister or case 34. At this time the spring 134 forces the release pin 132 to the right as shown in FIG. 7. The pressure of the water holds the canister cover 118 down against the canister or case 34 despite the pressure of conical spring 126 until, at a depth of about 40 feet, the conical spring 126 ejects the cover 118 and allows the water to react with the chemical and liberate the hydrogen gas required to maintain the flotation 28 at the desired depth.

Performance tests demonstrated the need for the cover because the gassing rate of the chemical is retarded with the increase in the pressure, and at a depth of about a thousand feet, the chemical gassing rate is negligible. Actually, a protective layer is formed on the top of the canister when subjected to high pressures, and when the pressure is released, it takes considerably time before the chemical reaches a normal gassing rate. The cover also serves to protect the chemical from moisture from the time it is packed until it is assembled in the beacon. The piston 136 and seal 137 keep moisture and seawater from passing through the chamber 135 and around the rod 120 and conical spring 126 and onto the chemical during storage and launching of the beacon.

The noisemaker assembly 14 is shown in more detail in FIGS. 8 and 9 and consists primarily of a main housing 142 which is made of hardened aluminum. This housing 142 serves as a generating structure for the noise waves and also serves as a housing for the motor 144 which drives the noisemaker. At the casing 12 end of the noisemaker is shown an O-ring seal 146 for sealing the casing 12 to the noisemaker 14, a plurality of roll pins (not shown) fasten the casing 12 to the noisemaker 14. A spindle 148 is shown attached to the shaft 149 of the moter 144 at one end and supported by a ball-bearing 152 at the other end. A pair of cylindrical rollers 150 having longitudinally cut V grooves are mounted with the spindle 148, which rotates the rollers 150, which, by centrifugal force, move out and strike the inner diameter 153 of the housing 142. A housing cap 154 is shown at the ball-bearing 152 end of the housing 142 and is sealed by an O-ring 156.

During the course of the development of this device it became important to have a fundamental frequency of about 20 Kc and to increase the high frequency output in the region from 20 to 90 kilocycles. This was successfully accomplished in the 20 -60 kilocycle range by decreasing the inner diameter of the main housing 142 which resulted in a thick cylinder. However, it was further required to increase the output in the neighborhood of 60 to 90 kilocycles. A number of ideas were suggested, but the only successful one was by providing a plurality of longitudinal holes such as shown at 158 between the inner diameter 153 and the outer diameter of the main housing 142. The acoustic measurements as shown in FIG. 10 demonstrated the superiority of the hollow wall construction over that of other types.

In FIG. 10 the dotted line 160 corresponds to a noisemaker having a solid main housing, but having an inner diameter and an outer diameter equal to that shown in FIGS. 8 and 9. A solid line 162 is a curve of the output of the main housing 142 with the holes 158 as shown in FIGS. 8 and 9.

The ordinate of the curves of noise level in decibels refer to the noise level, measured by an underwater hydrophone 3 feet from the noisemaker, in decibels, taken for a one cycle per second band width relative to a root mean square sound pressure of 0.0002 dynes per square centimeter. The abscissa of the curve is in kilocycles per second. An overall level of 164 db was measured for the solid cylinder and 166 db for the hollow wall cylinder.

No satisfactory theory is advanced for the superiority of this construction in the area from 60 to 90 kilocycles, but the results are as shown.

It should be understood, of course, that the forgoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. An acoustic jammer assembly constructed for ejection from a signal tube on a submarine, said assembly comprising a cylindrical casing for containing various elements of the jammer; a high frequency acoustic noisemaker attached to one end of said casing and comprising a thick wall cylinder having the same outer diameter as said casing and incuding an energizing motor; a sea cell battery physically connected to said and electrically connected to said motor for energizing said motor and mounted inside said casing; a flotation unit mounted inside said casing and physically connected to said battery; said flotation unit comprising a collapsed parachute, an inflatable balloon having a gas generating balloon inflating canister having a gas discharge opening in communication with the interior of said balloon, and a regulating valve in said balloon and actuated by said parachute for regulating the flotation depth of said flotation unit; a conical spring ejector compressed between said flotation unit and said battery for ejecting said flotation unit from said casing; a removable end cover plate for the casing, said cover plate including a trigger actuated mechanism so constructed as to be operated upon passage of the assembly through said signal tube thereby releasing the cover plate from the casing, whereby said compressed ejector spring may eject said flotation unit and allow water to come in contact with the gas generator and battery.

2. An acoustic noisemaker assembly for underwater acoustic jamming comprising, a casing for containing various elements of the assembly; a noisemaker attached to one end of said casing and comprising a thick wall cylinder having the same outer diameter as said casing, an electric motor forming part of said noisemaker, a spindle driven by said motor and rotatably mounted within said thick wall cylinder, a plurality of roller hammers rotatably mounted within said spindle and having V-grooves for striking said cylinder, said cylinder having a plurality of longitudinal holes formed therein for extending and increasing the high frequency acoustic output of said noisemaker brought about by the striking of said roller hammers against the interior of the casing; a sea cell battery mounted within said casing and physically connected to said noisemaker, said battery being electrically connected to said electric motor for energizing the same upon entry of water into said casing and upon contact of said water with said battery; a flotation unit mounted within said casing comprising a foldable parachute, an inflatable balloon for supporting said beacon at a regulated depth below the surface of the water, a regulating valve having a valve body attached to said balloon at one end and including a central opening having one end in communication with the interior of the balloon, a valve seat mounted adjacent said central opening for closing said central opening, and sylphon bellows means connected between said parachute and said valve seat for closing said central opening and regulating the depth of said beacon under water in response to the movement of said parachute and the pressure of said water, a variable length gas escape tube within said balloon and connected to the innermost end of said valve for regulating the amount of gas in said inflatable balloon, a chemical canister attached to the other end of said balloon comprising, a case, a quantity of chemical within said case for generating a buoyant gas, a cover mounted on said base having a water pressure sensitive means for releasing said cover from said case, and means for ejecting said cover from said case mounted between said cover and case; a cord connected between said canister and battery for supporting said noisemaker below said flotation unit; sleeve means mounted around said flotation unit; conical spring ejector means mounted around said cord between said sleeve means and battery for ejecting said flotation unit; and a trigger mechanism mounted on the other end of said casing having a locking means between said mechanism and casing and a trigger arm mounted on said mechanism for releasing said locking means as said beacon is ejected from the signal tube of the submarine for acoustic jamming.

3. A noisemaker beacon assembly comprising, a casing constructed for insertion into and ejection from a signal tube on a submarine, a noisemaker fixedly attached to one end of said casing, a motor within said casing drivably connected to said noisemaker, a sea battery cell within said casing and electrically connected to said motor, a flotation assembly removably mounted within said casing, a compressed spring assembly interposed between said flotation unit and said sea cell, a removable closure cap at one end of said casing constructed to hold said flotation unit and compressed spring assembly within the casing, a trigger mechanism on said closure cap so constructed that upon actuation thereof said closure cap is released from the casing and the flotation assembly ejected therefrom by said spring; said trigger mechanism extending beyond the side of the casing and adapted to be operated as said casing is ejected from said signal tube.

4. A noisemaker beacon according to claim 3 but further characterized by a shear screw threadable into said trigger mechanism and adapted to temporarily hold said trigger arm before launching.

5. A noisemaker beacon according to claim 3 but further characterized by a spring operated lock for holding said trigger mechanism and said casing together before said arm is tripped.

6. A noisemaker beacon according to claim 3 but further characterized by a water inlet hole in said casing and an O-ring seal around said hole adapted to be closed by said trigger arm.

* * * * *